United States Patent Office 3,711,356
Patented Jan. 16, 1973

3,711,356
METHOD OF MAKING A COMPOSITE STRUCTURE OF AN AROMATIC POLYIMIDE RESIN AND NOVOLAK PHENOLIC RESIN
Alva L. Herman, deceased, late of Wilmington, Del., by Florence Royce Herman, executrix, Wilmington, Del., assignor to E. I. du Pont de Nemours and Company, Wilmington, Del.
No Drawing. Original application Feb. 2, 1967, Ser. No. 613,431. Divided and this application July 13, 1970, Ser. No. 54,652
Int. Cl. C09j 5/00
U.S. Cl. 156—306                           8 Claims

ABSTRACT OF THE DISCLOSURE

Novolak phenolic resin forms a strong bond with coalesced aromatic polyimide resin when compacted and cured in contact therewith.

---

This application is a divisional application of U.S. Ser. No. 613,431 filed Feb. 2, 1967, now abandoned.

This invention relates to composite structures of coalesced aromatic polyimide resin bonded directly to cured novolak phenolic resin.

Aromatic polyimide resins are a relatively new class of plastics which possess high strength and stability to heat. These resins are described, for example, in U.S. Pat. No. 3,179,634 to Edwards. These resins are obtainable in particulate form which can be fabricated into solid molded articles by the simultaneous application of pressure of about 3,000 to 30,000 p.s.i. and temperatures of about 200 to 500° C. as described in U.S. Pat. No. 3,179,631 to Endrey. Under these conditions, the resin particles coalesce to form the molded article exhibiting the properties hereinbefore described.

On occasion, it has been desired to secure the molded article of polyimide resin to other less costly engineering plastic materials. Prior to the present invention this securement has required an adhesive, such as epoxy adhesive, disposed between the molded article and the other material to achieve a high strength bond. Unfortunately, many of the available adhesives often do not have the physical properties necessary to withstand applications of the composite structure of polyimide resin and other plastic. Those adhesives which do have the required physical properties are difficult to use.

It has now been found that novolak phenolic resin will bond directly, i.e., without the presence of other adhesive, to the molded article of coalesced aromatic polyimide resin, in which the bond strength in compressive shear between the phenolic resin and the polyimide resin is at least 1,000 p.s.i. measured by the test described in Example 1, and preferably at least 1,500 p.s.i. Thus, the present invention is of a novel composite structure which for simplicity can be depicted as follows:

coalesced aromatic polyimide resin
---
cured novolak phenolic resin in which the interface between the polyimide resin layer and the phenolic resin layer does not contain any third component adhesive. The relative thickness of these layers and their width can be varied as desired. The composite structure can be flat or it can have other shapes, such as curved.

The aromatic polyimide resins which are suitable for use in the present invention are the coalesceable particulate resins which are described in U.S. Pat. No. 3,179,631 to Endrey. An alternate process for preparing the particulate resin is described in U.S. Pat. No. 3,249,588 to Gall. The phenomenon of coalescence is disclosed in the first-mentioned of these patents. "Coalesceable" as used herein with respect to aromatic polyimide resin means that this phenomenon is produced by the simultaneous application of heat and pressure as hereinbefore described to the resin in particulate form. A preferred polyimide is poly-N,N'-(4,4'-oxydphenylene) pyromellitimide.

The phenolic resins which are useful in the present invention as a directly bondable substrate to the coalesced aromatic polyimide resin are the novolak phenolic resins. These are a well-known class of fusible resins which are prepared by reacting an excess of phenol with formaldehyde in the presence of acid catalyst. Molding powders of these resins are cured or hardened by incorporating thereinto a catalyst and an agent which supplies additional formaldehyde under heating, such an agent being hexamethylenetetramine which may perform both functions, and thereafter heating between about 150 and 180° C. The term novolak phenolic resin refers to the resin containing the curing agent.

To practice the present invention, the novolak phenolic resin molding powder is placed in contact with the molded article or layer of coalesced aromatic polyimide resin and the phenolic resin is cured. This process is conveniently carried out in a heated mold in which pressure is also applied to compact the phenolic resin and force it into intimate contact with the polyimide resin. Since the phenolic resin has a greater shrinkage than the polyimide resin, the phenolic resin may tend to pull away from the polyimide resin upon cooling. To avoid this result, pressure can be maintained on the phenolic resin until the composite structure has cooled, to prevent differential shrinkage. Alternatively or in addition, the phenolic resin can be filled with particulate material which reduces the shrinkage of the phenolic resin.

The novolak phenolic resin is to be distinguished from other types of phenolic resin, which can be called resol phenolic resins, which are usually made in the presence of alkaline catalyst and which contain sufficient formaldehyde left over from the resin forming phenol-formaldehyde reaction system to be sulf-curing, i.e., cured by the application of heat without the presence of an additional curing agent. The phenolic adhesives presently in general use are made of resol phenolic resins in a solution which wets the surfaces to be bonded. Only thin phenolic resin layers, i.e., six mils and less are formed from these adhesives for maximum adhesion. In contrast, when the resol phenolic resin is molded in solid form as described in the previous paragraph in contact with coalesced aromatic polyimide resin, the cured resol phenolic resin layer does not adhere to the polyimide resin layer.

The cured novolak phenolic resin layer of composite structures of this invention differ from cured resol phenolic resin layers obtained from adhesive solution in thickness; the cured novolak phenolic resin layer can be thick enough to serve as a support layer for the polyimide resin layer. Generally, the thickness of the cured novolak phenolic resin layer will be at least ten mils. Another difference is that the novolak phenolic resin is in solid form during its initial contact with the polyimide resin layer, it being understood that no solvent is later added, whereas resol phenolic resin in adhesive solution is in liquid form initially. When the initial contact between polyimide resin layer and resol phenolic resin layer is solid-to-solid, virtually no bond occurs therebetween after cure of the phenolic resin layer.

Since cured novolak phenolic resin has a modulus of elasticity which is about twice the modulus of elasticity of coalesced aromatic polyimide resin, the phenolic resin considerably stiffens the polyimide resin layer to which it is bonded. Thus, the polyimide resin can be used in applications requiring stiffness beyond that which the polyimide resin alone normally provides. Either the polyimide resin layer or the phenolic resin layer can contain uniformly dispersed, finely divided or particulate inert filler material, the particular material and amount depending on the use to which the composite structure is to be put. By filling the phenolic resin with inert filler, its modulus of elasticity can be increased to about three to five times that of the polyimide resin.

For example, either layer or both layers can contain fillers as finely divided glass, asbestos, or abrasive material or metal powder, such as aluminum. The exposed surface of the polyimide resin layer containing one or more of these fillers is useful in applications involving friction gripping of relatively moving surfaces, such as a clutch or brake shoe facing, with the phenolic resin layer acting as a support for the polyimide resin layer. In this application, the polyimide resin layer can contain from about 35 to 60% by weight of resin and, to total 100%, 15 to 50% by weight of fibrous filler, 2 to 10% by weight of abrasive, 5 to 20% by weight of metal powder, and 0 to 20% by weight of glass. When the abrasive filler is high density, as little as 20% by weight of the resin layer can be resin. Another application of the composite structure is in the composite rim grinding wheel disclosed in U.S. Pat. application Ser. No. 591,443, filed Nov. 2, 1966 by Bragaw, in which the inert filler is diamond and SiC abrasive particles. The polyimide resin layer can also contain a low friction producing material such as finely divided graphite or $MoS_2$. Composite structures of this invention can be mounted to other structures by conventional gluing or mechanical fastening techniques.

The following examples are illustrative of composite structures of this invention.

EXAMPLE 1

The polyimide resin is poly-N,N'-(4,4'-oxydiphenylene) pyromellitimide prepared according to the procedure set forth in U.S. Pat. No. 3,249,588 to Gall and has a surface area of about 70 m.$^2$/g. The precursor polyamide acid has an inherent viscosity of about 0.60 measured as a 0.5% by weight concentration in pyridine at 35° C. The novolak phenolic resin molding powder is a general purpose molding resin available as BRP–5727 from Union Carbide.

The polyimide resin is formed into a disc 1¼ inches in diameter and ¼ inch thick by heating a preform at 460° C. in a mold and applying pressure of 12,000 p.s.i. for 30 minutes. The preform is prepared by molding particulate resin at about 1,300 p.s.i. and 25° C. followed by heating in a vacuum at 325° C. for 16 hours. The resultant disc of coalesced aromatic polyimide resin is cleaned and placed in a cold, close fitting circular mold and 6.5 g. of the phenolic resin is placed on top of the disc and leveled. The phenolic resin is molded at 160° C. under a pressure of 3,000 p.s.i. applied for 15 minutes in the direction of the flat face of the disc of polyimide resin. The resultant composite structure is ejected from the mold and heat treated in an air oven for 16 hours at 100° C. to complete the cure. The composite structure thus produced in the form of a cylinder is ½ inch thick and 1¼ inches in diameter consisting of two resin layers, each ¼ inch in thickness.

Compressive shear test.—A test specimen is obtained from the cylinder in the following manner. A portion of the cylinder is cut off parallel to and ½ inch from the axis of the cylinder. A second portion is removed by making a cut plane and parallel to the first cut 1 inch away. Similar cuts are then made perpendicular to the first two and parallel to the axis of the cylinder. The resulting shape is a parallelepiped test specimen with rounded vertical edges. Two parallel slots ¼ inch deep are then cut on opposite faces ¼ inch apart, one in each resin layer, to produce a lap shear test area 1 inch x ¼ inch.

The test specimen is mounted in a testing machine of the constant rate of crosshead movement type as described in ASTM D695, item 4. Crosshead speed is set at 0.05 inch per minute, and the specimen is loaded under compression until failure. A unit shear stress is then calculated from the load in pounds at failure and the lap area of 0.25 square inch and found to be 1280 p.s.i.

EXAMPLES 2–18

Example 1 is repeated using various resins and fillers, and the results are summarized in the table. Polyimide A is poly-N,N'-(4,4'-oxydiphenylene) pyromellitimide of Example 1, polyimide B is that obtained from 3,4,3',4'-benzophenone tetracarboxylic dianhydride and 4,4'-oxydianiline prepared as disclosed in U.S. Pat. No. 3,249,588 to Gall and has a surface area of about 80 m.$^2$/g. The precursor polyamide acid has an inherent viscosity of about 0.65 measured as hereinbefore stated. Phenolic resin A is the same as used in Example 1; phenolic resins B and C are general purpose novolak resins having different melt flow than resin A and available as BRP 5417 and BRP 5215, respectively from Union Carbide. Phenolic resin D is a resol-type resin, and phenolic resin E is a novolak-type resin, both made according to the procedures given in "Preparatory Methods of Polymer Chemistry" by W. R. Sorenson and T. W. Campbell, Interscience Publishers, Inc., New York, 1961, pages 294, 295. Filler loadings are given in volume percent throughout. Fillers are 240 grit silicon carbide, 200 atomized aluminum powder, and a particulate polyimide powder of polyimide resin A. For the molded cylinders prepared using phenolic resin D (Examples 6 and 17), the phenolic resin layer broke away from the polyimide layer upon handling.

TABLE

| Example | Polyimide layer | | | Phenolic layer | | | Shear adhesion,[5] p.s.i. |
|---|---|---|---|---|---|---|---|
| | Resin | Filler | Percent | Resin | Filler | Percent | |
| 2 | A | | | A | PI[4] | 60 | 1,650 |
| 3 | A | SiC | 25 | A | | | 1,470 |
| 4 | A | SiC | 25 | A | | | 1,600 |
| 5 | A | SiC | 25 | B | | | 3,240 |
| 6 | A | SiC | 25 | D | | | None |
| 7 | A | SiC | 25 | A | SiC | 25 | 6,800 |
| 8 | A | SiC | 25 | A | Al | 20 | 5,300 |
| 9 | A | SiC | 25 | A | Al | 60 | 5,600 |
| 10 | A | SiC | 25 | A | PI | 60 | 4,009 |
| 11 | A | SiC | 25 | A | Al, PI | 30, 30 | 2,700 |
| 12 | A | SiC | 25 | E[1] | Al, PI | 30, 30 | 3,000 |
| 13 | A | SiC | 25 | E[2] | Al, PI | 30, 30 | 2,000 |
| 14 | A | SiC | 25 | E[3] | Al, PI | 30, 30 | 2,120 |
| 15 | A | SiC | 25 | C | Al, PI | 30, 30 | 2,930 |
| 16 | A | SiC | 25 | B | Al, PI | 30, 30 | 3,950 |
| 17 | A | SiC | 25 | D | Al, PI | 30, 30 | None |
| 18 | B | SiC | 25 | A | Al, PI | 30, 30 | 3,500 |

[1] 10% hexamethylenetetramine (hexamine).
[2] 13% hexamine.
[3] 13% hexamine plus calcium stearate and magensium oxide.
[4] Particulate polyimide resin.
[5] By the Compressive Shear Test.

As many apparently widely different embodiments of this invention may be made without departing from the spirit and scope thereof, it is to be understood that this invention is not limited to the specific embodiments thereof except as defined in the appended claims.

What is claimed is:

1. A process for manufacturing a composite structure having a layer of coalesced polyimide resin bonded to a layer of a cured novolak phenolic resin, said process comprising contacting a coalesced aromatic polyimide resin layer and a shapable novolak phenolic resin under heat and pressure at a temperature between about 150° C. and about 180° C. thereby to urge said novolak phenolic resin into intimate contact with said polyimide resin to form a composite structure having a cured novolak phenolic resin layer of at least 10 mils thickness, and subsequently releasing the applied force whereby to obtain said composite structure.

2. The process of claim 1 wherein said composite structure is cooled before the applied force is released.

3. The process of claim 1 wherein said composite structure is subsequently heat-treated.

4. The process of claim 1 wherein said novolak phenolic resin contains particulate material dispersed therein.

5. The process of claim 4 wherein said particulate material is aluminum.

6. The process of claim 1 wherein said coalesced aromatic polyimide resin layer contains particulate material dispersed therein.

7. The process of claim 6 wherein said particulate material is SiC.

8. The process of claim 6 wherein said particulate material comprises diamonds.

References Cited

UNITED STATES PATENTS

| | | | |
|---|---|---|---|
| 3,371,009 | 2/1968 | Traynor et al. | 156—331 X |
| 3,449,193 | 6/1969 | Bratton et al. | 156—331 X |

CARL D. QUARFORTH, Primary Examiner

S. J. LECHERT, Jr., Assistant Examiner

U.S. Cl. X.R.

156—245, 311